United States Patent
Andersson

[15] 3,701,933
[45] Oct. 31, 1972

[54] DEVICE FOR PAPER MACHINES

[72] Inventor: Sture Andersson, Vasteras, Sweden

[73] Assignee: Allmanna Svenska Elektriska Aktiebolaget, Vasteras, Sweden

[22] Filed: Aug. 13, 1969

[21] Appl. No.: 849,786

[30] Foreign Application Priority Data

Aug. 22, 1968  Sweden ............... 11343/68

[52] U.S. Cl. .................................. 318/7, 72/17
[51] Int. Cl. ..................................... B21b 37/06
[58] Field of Search ........ 318/49, 50, 6, 7; 226/2, 43, 226/45; 72/17 X

[56] References Cited

UNITED STATES PATENTS

| | | | |
|---|---|---|---|
| 3,188,841 | 6/1965 | Wallace | 72/17 X |
| 2,752,545 | 6/1956 | Halter | 318/7 |

FOREIGN PATENTS OR APPLICATIONS 715,996  9/1954  Great Britain ............. 318/7

Primary Examiner—J. D. Miller
Assistant Examiner—Robert J. Hickey
Attorney—Kenyon & Kenyon Reilly Carr & Chapin

[57] ABSTRACT

A device for controlling a paper web with at least two sections, each section being provided with its own driving member and amplifier for the speed control. A measuring means is arranged in this speed control to measure the position of the paper web and the output signal of said means is supplied to a summation amplifier. Said summation amplifiers are cascade-connected and their input sides are provided with emitters for process signals and potentiometers which are fed from a ramp voltage proportional to the speed of the machine and common for the device.

1 Claim, 1 Drawing Figure

PATENTED OCT 31 1972　　　　　　　　　　　3,701,933
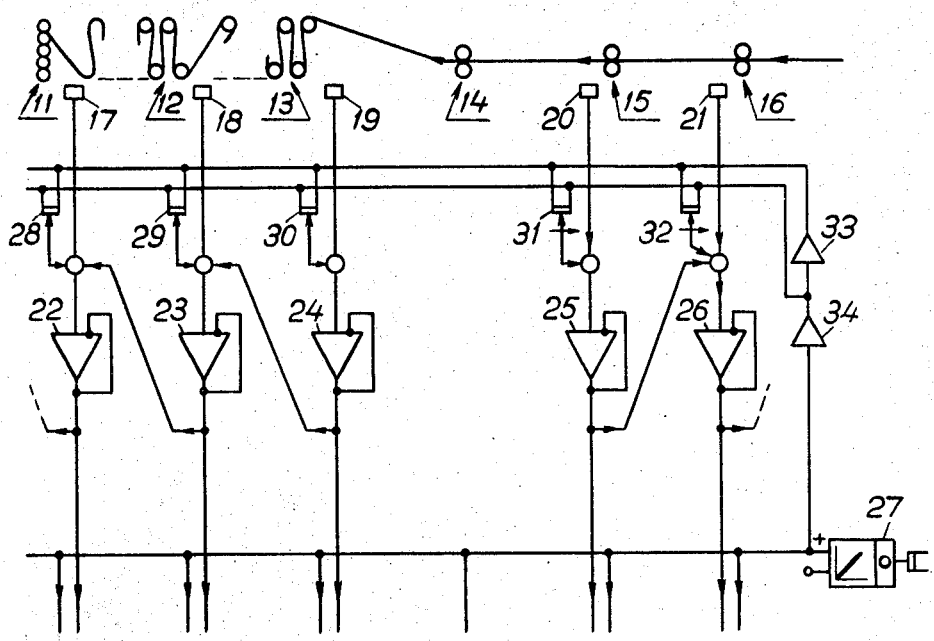
INVENTOR.
Sture Andersson
BY
Kenyon & Kenyon

DEVICE FOR PAPER MACHINES

BACKGROUND OF THE INVENTION

In the U.S. Pat. application Ser. No. 730,241 is described a device for controlling paper machines having at least two sections, preferably more, each with its own driving member and amplifier for the speed control, in which device a measuring means is arranged between the sections to indicate the position of the paper web, the output signal of said measuring means being supplied to an amplifier or summator.

STATEMENT OF THE INVENTION

In order to make such a device easy to manipulate and simple in design and to be able easily to alter for forwards or backwards adjustment or altered track speed with the special conditions prevailing in paper machines, certain special arrangements are necessary. The invention provides a solution of this and other similar problems and is characterized in that the amplifiers or summators are cascade-connected and that emitters for process signals and potentiometers are connected to their input sides, which are fed from a ramp voltage proportional to the speed of the machine and common for the device. One or more potentiometers can thus be switched without the position of the paper web between other sections being altered or disturbed. The advantages of the invention are described in the following with reference to the accompanying drawing.

DESCRIPTION OF THE PREFERRED EMBODIMENT

The drawing, which substantially corresponds to FIG. 2 of said U.S. patent application, shows a paper web machine with a number of sections or groups 11, 12, 13, 14, 15 and 16. Between these different sections, groups measuring means, known per se, are arranged for the web position 17, 18, 19, 20, 21 and the output signal from these members is supplied to a number of cascade-connected amplifiers or summators 22 to 26 (fed-back).

From a common integrating amplifier 27 and additional amplifiers 33, 34 a ramp voltage is withdrawn (+KU−KU), from which different reference voltages are taken out for each amplifier or summator, over potentiometers 28 to 32, the reference voltages being proportional to the machine speed to the respective amplifier or summator (22 to 26) for manual adjustment of the position of the web.

If, for example, the sum of the input signals from process emitter 20 and potentiometer 31 is $U_{n-1}$, and from emitter 21 and potentiometer 32 the sum is $U_{n-2}$, and from emitter 19 and potentiometer 30, the sum is $U_{n+1}$, from the emitter 18 and potentiometer 29 the sum is $U_{n+2}$ and from emitter 17 and potentiometer 28, $U_{n+3}$ is obtained. The output voltage from the summator will be proportional to $U_{n+1}+U_{n+2}+U_{n+3}$, from the summator 23 to $U_{n+1}+U_{n+2}$ and from the summator 24 to $U_{n+1}$. The output voltage from the summator 25 will be proportional to $U_{n-1}$ and from the summator 26 to $U_{n-1}+U_{n-2}$. Minor Adjustments in the speed of the various driving members (up to 1 or 2 percent) which may be necessary in paper machines can be carried out directly at the different potentiometers, which contributes to the slight reduction or extension at the various sections or groups.

In the example shown, the loop height or web position between the different stations is measured, and the obtained height signal is utilized. It is, however, not necessary to form a loop between the stations, there may also be arranged a measuring device at a web for measuring the tension in the web, i.e., by using the well-known construction of a part of the web, running over two rolls between which there is arranged a loop with a weight loaded roll, the position of which is a value of web tension. Said value may be used in the same manner as the loop height, etc. as stated above.

The signals to the various driving members (not shown) of the motors do not need to be altered through various potentiometers on the output side of the summators (see parts 49–52 in FIG. 2 of the said U.S. patent application), due to the above-mentioned circumstances.

I claim:

1. Device for controlling paper web machines, comprising at least two drive sections along the web path, each section having a separate driving motor with motor control means, measuring means between said sections for measuring web relations, such as web position, web tension or the like, between the sections for each measuring means one summator, the output side of which is connected to control means of an adjacent motor for controlling the speed of the same, the output side of said measuring means being connected to the input side of the corresponding summator, reference sources with adjustable output magnitude being connected to the input sides of the summator for individual speed control of the corresponding motors, a common ramp voltage source, said reference voltage sources being fed from said common ramp voltage source for common speed control of all the motors, the output sides of each summator being connected to the input side of an adjacent summator with the exception of the last summator in each cascade, said last mentioned connections forming at least one cascade-connection within said device, the control means of the motors also being fed from the ramp voltage source besides the summators.

* * * * *